C. S. HEAD.
FRUIT GRADER.
APPLICATION FILED JUNE 29, 1912.
1,057,829.
Patented Apr. 1, 1913.
2 SHEETS—SHEET 2.
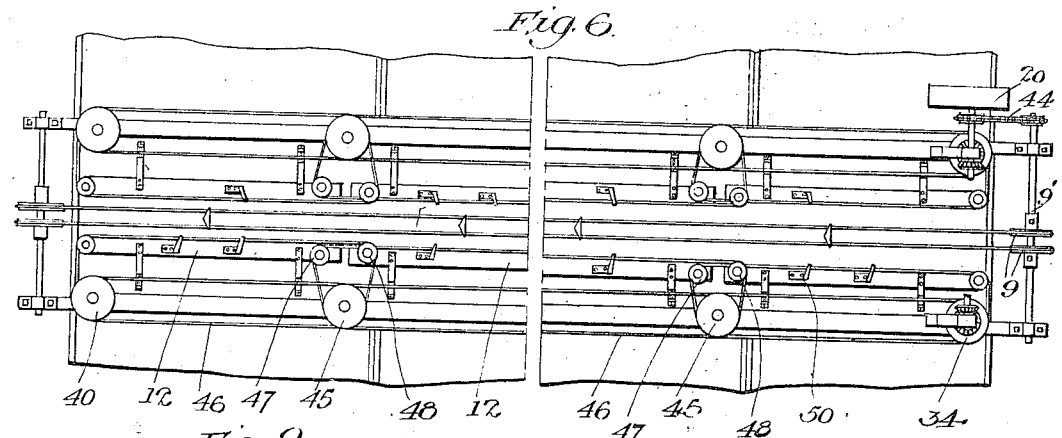
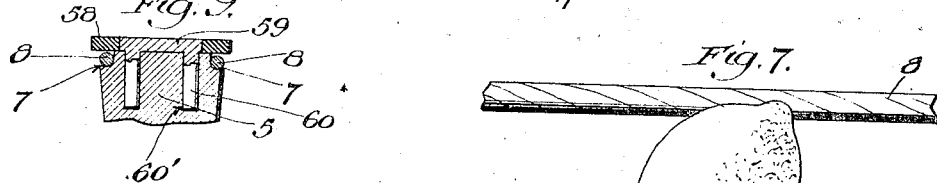
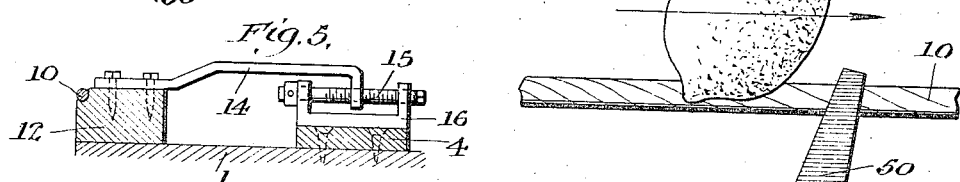
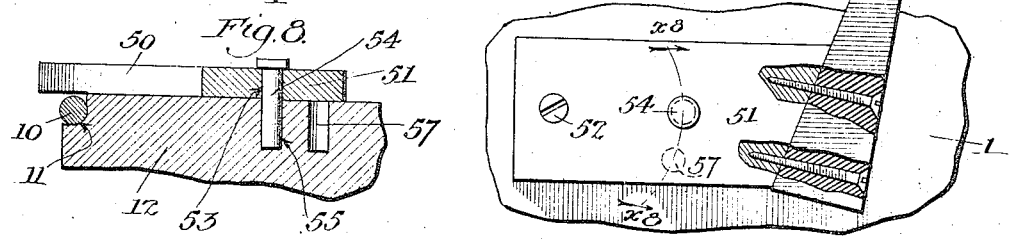
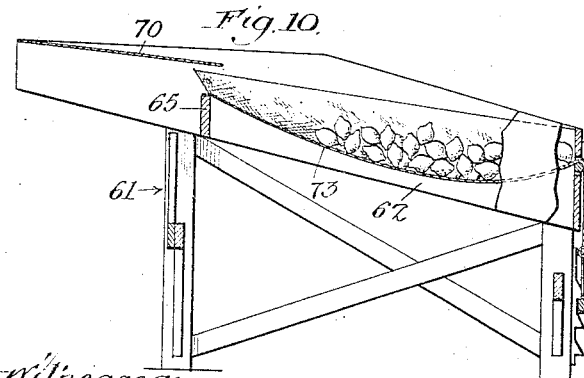
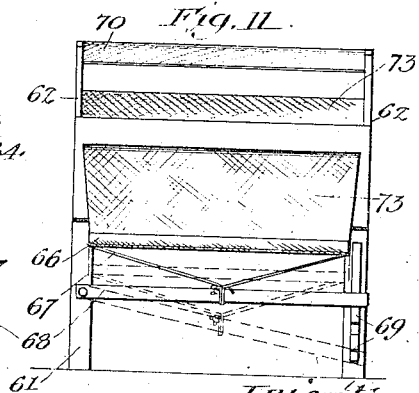
Witnesses:
Inventor:
Carlos S. Head

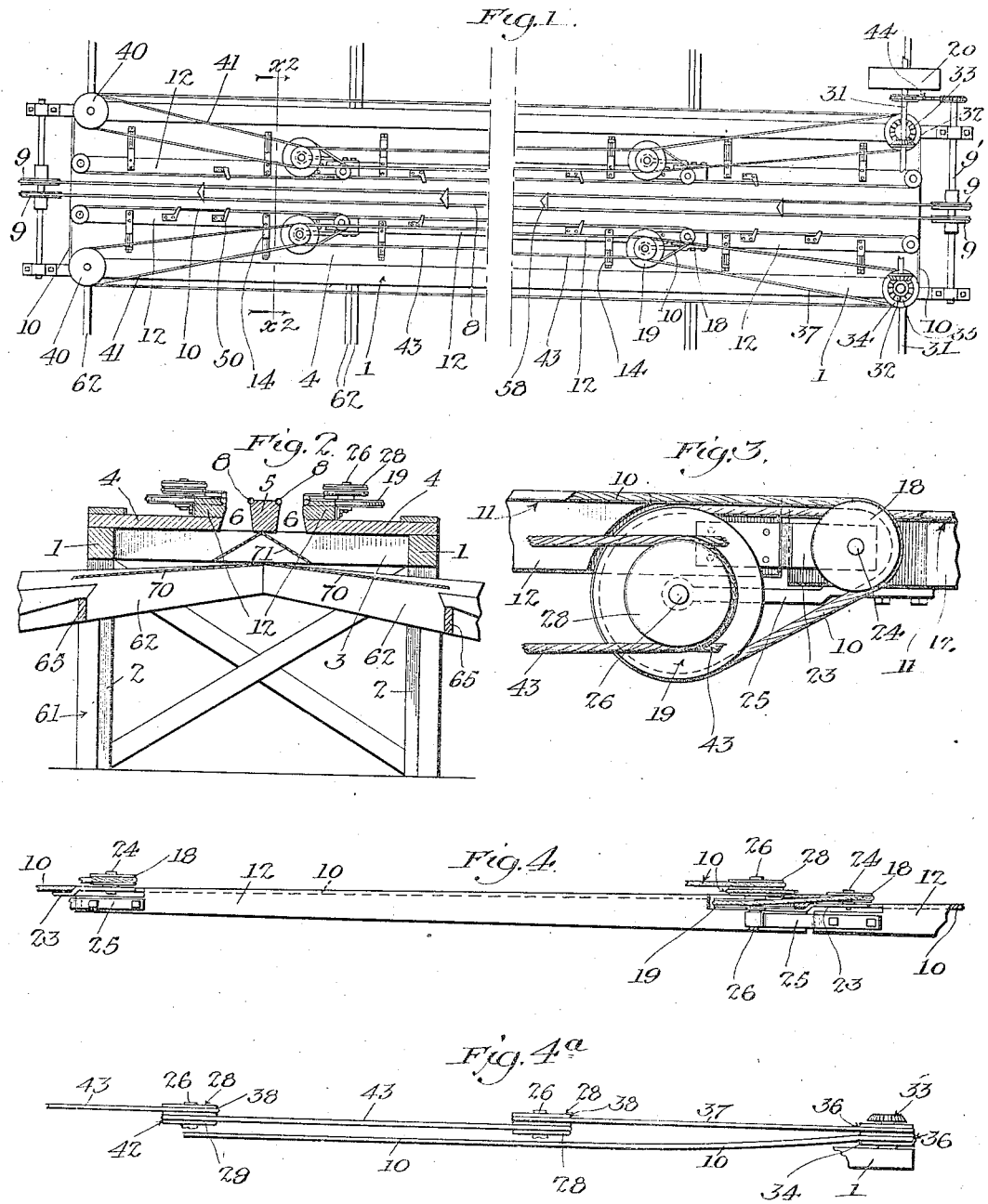

UNITED STATES PATENT OFFICE.

CARLOS S. HEAD, OF ORANGE, CALIFORNIA, ASSIGNOR OF ONE-FOURTH TO WILLIAM A. ZIMMERMAN AND ONE-FOURTH TO CHESTER E. LAMME, OF SANTA ANA, CALIFORNIA.

FRUIT-GRADER.

1,057,829.  Specification of Letters Patent.  Patented Apr. 1, 1913.

Application filed June 29, 1912. Serial No. 706,774.

*To all whom it may concern:*

Be it known that I, CARLOS S. HEAD, a citizen of the United States, residing at Orange, in the county of Orange and State of California, have invented a new and useful Fruit-Grader, of which the following is a specification.

This invention relates to machines for grading or sizing fruit, and the main object of the invention is to provide a fruit grader which will size or grade the fruit without subjecting the fruit to any frictional or other action liable to injure the delicate skin of the fruit.

I have found that fruit grading or sizing can be effectively performed with a minimum of injury to the fruit by means of a rope grader in which the fruit sizing aperture is formed by cables traveling in parallelism and having sections thereof spaced apart at greater distances to provide for the different sizes. To space the different sections of the cable in this manner, it is necessary to run the cables over guiding pulleys and with any considerable number of sizes, the amount of friction thereby introduced is such that undue strain is brought upon the grading rope.

An important feature of the present invention is the elimination of the strain by providing for driving of the grading rope at a plurality of points along its length.

Another object of the invention is to provide means for causing the fruit to be turned from time to time as it passes along the grading way, so as to present different aspects of the fruit to the grading apertures.

Another object of the invention is to provide an improved bin for receiving the fruit from the grading device, such bin being provided with means for enabling the fruit to be raised into convenient position for packing.

Other objects of the invention will appear hereinafter.

The accompanying drawings illustrate embodiments of my invention, and referring thereto: Figure 1 is a plan of one form of the grading machine. Fig. 2 is a vertical section thereof, on line $x^2$—$x^2$, Fig. 1. Fig. 3 is a plan of a set of driving and guiding pulleys for the grading cable. Fig. 4 is a side elevation of one of the supporting and guiding strips for a section of the grading cable. Fig. 4ª is a side elevation of the driving means. Fig. 5 is a vertical section of such supporting and guiding strip, showing the adjusting means therefor. Fig. 6 is a plan of another form of the grading machine. Fig. 7 is a plan of a portion of the grading way with one of the fruit turning fingers adjacent thereto. Fig. 8 is a section on line $x^8$—$x^8$, Fig. 7. Fig. 9 is a vertical section of another form of the turning devices. Fig. 10 is a vertical section of one of the bins. Fig. 11 is a front elevation thereof.

Referring to Figs. 1 and 2, the machine comprises a frame which may comprise longitudinal members 1, supporting posts 2 and transverse members 3 constituting a support for longitudinal boards or members 4, and a longitudinal center strip 5, said center strip being interposed between said boards 4 and spaced therefrom to form two elongated apertures or slots 6. The machine shown in the drawing is a double machine, having two grading ways for the front, and the two sides of the machine being alike, a description of one side of the grading device will suffice for both. The upper corners of the center bar 5 are grooved as shown at 7 to form runways for ropes or cables 8 which run over pulleys 9 and return below the table, each cross rope or cable 8 forming one side of the fruit runway or gradeway. The other side of the fruit runway or gradeway is formed by a rope 10 which runs in a groove 11 formed in the upper inner corner of each of a plurality of strips 12, said strips being mounted on top of the boards or table members 4 to slide toward or from the center bar 5 so as to adjust the width of each section of the gradeway. This adjustment of the strip 12 may be effected by any suitable means, for example, by means of arms 14 secured to said strip and threaded to engage a screw shaft 15 mounted to turn in a bracket 16 fixed on the member 4, so that by turning said shaft, the position of the bar 12 may be adjusted. Each bar 12 carries guide pulleys for the grading rope 10, there being, for example, a small guide pulley 18 at the front end of each strip and a large guide pulley 19 at the rear end of each strip, said large guide pulley being also used as a driving pulley. The large guide pulley 19 preferably has its periphery somewhat farther from the center of the machine than the smaller pulley and at a lower level than said smaller pulley, so that the grading rope as shown in Figs. 3 and 4 passes alongside the pulley 19, around the pulley 18, then backwardly and downwardly around the pulley 19 and then forward under the pulley 18, this final lower run of the grading rope being somewhat farther from the center of the machine than the upper run, so as to provide for the stepping of one grade to the next larger one, the pulleys being so placed and supported on the respective strips 12 that the upper run of the rope which runs on the pulley 18 travels in the groove 11 on the next preceding strip and the lower run after it leaves the pulley 19, travels in the groove 11 of the next succeeding strip. To provide for this I support the pulley 18 from the preceding strip by a bar or bracket 23 extending from and secured to said preceding strip and having a stud shaft 24 thereon for the pulley 18, and the pulley 19 is supported by a bar or bracket 25 secured to the succeeding strip and extending rearwardly therefrom and carrying a stud shaft 26 forming a journal bearing for the said pulley. Thus, however, the strips 12 may be adjusted, the pulleys corresponding thereto will move therewith, so that the belt will always run properly in the groove in each section.

As stated, the guide pulleys 19 are preferably utilized as driving pulleys. For this purpose each pulley 19 has secured thereto, a driving pulley 28 having grooves which receive the driving ropes hereinafter described. Power is applied by any suitable means to the machine, for example, by a pulley 20 carried by a shaft 31 which carries bevel gears 32 engaging with bevel gears 33 on pulleys 34, journaled on the table or frame 1, and provided with grooves for receiving, guiding and driving the grading rope 10. Each pulley 34 is further provided with a groove 36 for receiving a rope 37 which runs in groove 38 for the guiding and driving pulleys 19 for the end section nearest the driving end of the machine. Similar pulleys 40 may be provided at the farther end of the machine for receiving, guiding and driving the grading rope 10 and for receiving, guiding and driving a rope 41 running in groove 42 of the guiding and driving pulley 19 for the section at that end. A rope 43 connects each driving and guiding wheel 19 to the next succeeding driving and guiding wheel, the groove 38 of said wheel receiving the rope 43 running from the next preceding wheel and the groove 42 receiving the rope 43 leading to the succeeding wheel, or vice versa, so that pulleys 19 are connected in a continuous series and the driving rope system is connected at each end to the driving pulleys 34 and 40. By this means, I distribute the driving action to a number of points along the belt, preferably as many points as there are grading sections, though it will be understood that the invention is not necessarily limited to driving at each and every section. Pulleys 9 may be driven from shaft 31 by chain 44 running on sprocket wheel on shaft 31 and on shaft 9' carrying pulleys 9, the driving gears being so proportioned that the grading ropes 9 and 10 run at the same speed, so that there is no tendency to turn or rub the fruit.

In place of utilizing the intermediate driving pulleys 19 as guiding pulleys, as above described, the intermediate driving pulleys may be made as separate pulleys, as indicated at 45 in Fig. 6, said pulleys 45 being journaled on the frame 1 and being operated by driving belts 46 which connect the intermediate driving pulleys 45 and the end driving pulleys 34 and 40. In this case the run of the cable forming the stepped side of the gradeway is guided by pulleys 47 and 48 on the respective strips 12, and the grading rope passes first around pulley 48, then around the driving pulley 45, then around the pulley 47 and then forwardly under the pulley 48 to the next section of the gradeway. The construction may be otherwise as above described.

The means for turning the fruit in its passage along the gradeway consists preferably of fingers or obstructing members 50 preferably of soft yielding material such as soft rubber, secured on supporting members 51 fastened to the side strips 12 preferably in such manner as to enable the fingers to be moved into and out of operative position. For this purpose the supporting member 51 may be pivoted to the side strip 12 by pivot 52 and may be perforated at 53 to receive a pin 54 which may be inserted in a hole 55 in the side strip to hold the obstructing member or fingers 50 in position shown in Fig. 6, so that its inner end will extend into the path of motion of the fruit passing along the gradeway. In case it is desired to throw this turning means out of operation, the pin 54 may be withdrawn from the hole 55, the supporting member 51 turned so as to swing the finger 50 away from gradeway and held in this position by placing the pin 54 in a hole 57 in the supporting strip. A number of these turning devices may be distributed along the gradeway at suitable intervals. In case a double machine is used as shown in the drawings, the fingers or obstructing members on the inner side of the gradeway may consist of elastic arms 58 on a fixed block 59 supported on the central strip or bar 5 of the machine and extending in each direction from the center into the respective gradeway on opposite sides. The blocks 59 may be removably mounted on the bar 5, for example, by dowel pins 60 or the blocks engaging in holes 60' in bar 5.

Any suitable construction of bin may be used with the above described grading means, but I prefer to use the form shown in Figs. 10 and 11, comprising a bin frame 61 formed with side walls 62 and with a front wall 63, said front wall having a horizontal slot 64 through which passes an apron or flexible bottom 73 for the bin, said apron being secured at its upper end to a cross bar 65 and being connected at its lower end to a cross rod 66 which is connected by cords 67 to a lever 68 pivoted at one end to the frame 61 and adapted to engage at its other end with ratchet teeth 69 on the other side of the frame, the pivotal mounting of said lever being sufficiently loose to enable the lever to be swung into and out of engagement with said ratchet teeth. At the upper, inner end of the bin, a receiving apron 70 of suitable fabric is arranged to receive the fruit from a hogback 71 extending longitudinally under the central bar 5 of the machine.

The operation is as follows: The driving means 20 being set in operation, the driving cables 37, 41 and 43 are thereby operated, causing the end pulleys 34 and 40 and intermediate pulleys 19 to be rotated and thereby imparting a driving action to the grading cable at various points along its length, the driving force being applied to the cable directly at or adjacent to the portion thereof which is passing around the guide pulleys, these portions being those in which the friction is developed tending to resist the movement of the rope so that accumulative action of such friction in retarding or stopping the movement of the rope is prevented. By driving the grading table at various points along its length as stated, I am enabled to use a cable with a considerable number of grades, for example, the usual number of nine grades or sizes, without introducing sufficient friction to prevent the successful operation of the grading rope, and am thereby enabled to render practicable the rope grader which would otherwise be impracticable for the standard number of sizes. The rope grader is of advantage in that it does not of itself rub or grind the fruit, but carries it along in the position in which it is deposited so that the wear and injury to the fruit are reduced to a minimum. With some fruit it is desirable to pass the fruit along the grader without turning, and with such fruit the obstructing fingers 50 are turned out of the way and obstructing devices 59 are removed so that the fruit passes along on the ropes without being turned. With other fruit, for example, lemons, which are elongated in shape, it is desirable to provide for bringing the fruit to position in which its minimum diameter from cheek to cheek will be extended crosswise of the gradeway, and with such fruit, the obstructing fingers 50 are turned to position shown in Fig. 7, so as to touch the fruit at one or the other end as it passes along, and set it lengthwise of the gradeway, these obstructing fingers being placed alternately on opposite sides so as to insure contact thereof with the fruit.

What I claim is:

1. In a fruit grader, a grading rope, pulleys carrying and guiding said grading rope, said pulleys being arranged to provide a series of graded sections in the grading rope, and means for driving said grading rope at a plurality of points along its length, adjacent to the guide pulleys therefor.

2. A fruit grader comprising a frame, a straight grading rope extending along said frame, pulleys for carrying and driving said straight grading rope, a plurality of strips adjustably mounted on said frame, pulleys carried by said strips, a grading rope carried by said last named pulleys, and means for applying power to said driving rope adjacent to said last named pulleys.

3. A fruit grader comprising a frame, pulleys thereon, a grading rope mounted on said pulleys, means for driving said pulleys, said plurality of guiding pulleys disposed at different points along the length of said grading rope, driving and guiding pulleys adjacent to said intermediate guiding pulleys and means for driving said driving and guiding pulleys to impart power to the grading rope at various points along its length.

In testimony whereof, I have hereunto set my hand at Los Angeles, California this 17th day of June, 1912.

CARLOS S. HEAD.

In presence of—
ARTHUR P. KNIGHT,
MARTHA M. LANGE.